US012370618B2

United States Patent
Reichert LaMorte et al.

(10) Patent No.: US 12,370,618 B2
(45) Date of Patent: Jul. 29, 2025

(54) SYSTEM AND METHOD FOR DETERMINING WELD COOLING RATE IN-SITU

(71) Applicant: Edison Welding Institute, Inc., Columbus, OH (US)

(72) Inventors: Constance T. Reichert LaMorte, Columbus, OH (US); Tom McGaughy, Hilliard, OH (US)

(*) Notice: Subject to any disclaimer, the term of this patent is extended or adjusted under 35 U.S.C. 154(b) by 953 days.

(21) Appl. No.: 17/480,403

(22) Filed: Sep. 21, 2021

(65) Prior Publication Data

US 2023/0093372 A1    Mar. 23, 2023

(51) Int. Cl.
*B23K 11/25* (2006.01)
*G01K 1/143* (2021.01)
*G01K 3/04* (2006.01)

(52) U.S. Cl.
CPC .............. *B23K 11/25* (2013.01); *G01K 1/143* (2013.01); *G01K 3/04* (2013.01)

(58) Field of Classification Search
CPC ........... B23K 11/25; G01K 1/143; G01K 3/04
USPC .................................................. 219/110, 109
See application file for complete search history.

(56) References Cited

U.S. PATENT DOCUMENTS

| | | | | |
|---|---|---|---|---|
| 5,902,935 A | * | 5/1999 | Georgeson | B29C 66/532 73/827 |
| 2014/0374396 A1 | * | 12/2014 | Luo | B23K 9/0282 219/136 |
| 2015/0083693 A1 | * | 3/2015 | Schroth | B23K 11/34 219/86.31 |
| 2016/0356734 A1 | | 12/2016 | Ja et al. | |
| 2018/0015560 A1 | | 1/2018 | Narayanan et al. | |
| 2019/0184482 A1 | | 6/2019 | Holverson et al. | |
| 2021/0318673 A1 | | 10/2021 | Kitchen et al. | |

OTHER PUBLICATIONS

International Search Report and Written Opinion of the International Searching Authority for International Patent App. No. PCT/US2022/044198 dated as mailed on Dec. 23, 2022 (9 pages).

* cited by examiner

*Primary Examiner* — Eric S Stapleton
*Assistant Examiner* — Yeong Juen Thong

(57) ABSTRACT

A method for determining the cooling rate of a weld, comprising locating at least one non-consumable thermal sensor at a predetermined location from a weld pool generated during an active welding process, wherein the thermal sensor is located within the same plane of travel as a welding device creating the weld pool; determining the travel speed of the welding device; using the at least one non-consumable thermal sensor to gather temperature data from the weld pool; and determining the time interval between when the weld pool has a first measured temperature and when the weld pool has a second measured temperature that is less than the first measured temperature, wherein the determined time interval represents the cooling rate of the weld.

17 Claims, 2 Drawing Sheets

SYSTEM AND METHOD FOR DETERMINING WELD COOLING RATE IN-SITU

BACKGROUND

The disclosed inventive subject matter relates in general to processes and methods used in oil and gas steel pipeline welding, and more specifically to a system and method for monitoring the cooling rate of a particular weld in real time.

The term "sour service" refers to a type of pipeline or storage vessel that is filled with substances containing hydrogen sulfide ($H_2S$) or sulfuric acid ($H_2SO_4$). For the service to be considered a sour service, hydrogen sulfide levels must be above a certain predetermined threshold. Sour service can subject the pipeline vessel material to corrosion. Sour service is a major concern for the oil and gas and wastewater industries. Bacteria in a product collected during the extraction process in the oil and gas industry mixed with high amounts of sulfates can result in a sour service condition. One method for combating sour service is through selecting materials such as stainless steel or low alloy steel that have extremely low levels of sulfur in their chemical composition. Organic inhibitors can also be used to prevent or kill microorganisms that commonly create sour service environments.

In addition to materials considerations, pipelines operating in sour service environments are typically constructed using welding procedures designed to limit weld and heat-affected zone (HAZ) hardness levels for reducing the potential for in-service hydrogen-assisted cracking (HAC). Such methods usually involve development of girth welding procedures that control the weld cooling rate to produce hardness values at or below 250 HV for the root pass region. Monitoring and controlling welding heat input and preheat or inter-pass temperatures are important elements of managing the weld cooling rate. While mechanized welding procedures are commonly used in pipeline fabrication, the welding operator must still ensure that appropriate weld parameters are used for hardness control. To increase assurance that weld zone hardness limits are being achieved, it would be advantageous to provide the welding operator with real-time information on weld cooling rates as an aid to controlling welding parameters or travel speeds to within targeted ranges.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

The disclosed technology provides an automated, in-situ method for continuously determining a weld cooling in real time as a weld is made. A principal application for this technology is mechanized pipeline girth weld fabrication for larger oil and gas transmission, gathering, and distribution pipelines (primarily involving orbital GMAW processes). An advantage of this technology is enhanced management of welding parameters for controlling resulting weld and HAZ hardness, particularly for pipelines that will experience sour service conditions where excessive hardness accelerates hydrogen attack and compromises pipeline integrity. Obtaining real-time temperature measurements immediately adjacent to a weld permits in-situ control of welding parameters such as, for example, amperage, voltage, and travel speed for keeping a welding operation within a targeted and approved heat input range. By controlling thermal energy input to a weld, it is possible to manage resulting weld hardness and eliminate the possibility of achieving weld or HAZ hardness in excess of 250 HV, which is the code/standards limit for sour service pipelines.

One implementation of the disclosed technology provides a one method for determining the cooling rate of a weld, comprising locating at least one non-consumable thermal sensor at a predetermined location from a weld pool generated during an active welding process, wherein the thermal sensor is located within the same plane of travel as a welding device creating the weld pool; determining the travel speed of the welding device; using the at least one non-consumable thermal sensor to gather temperature data from the weld pool; and determining the time interval between when the weld pool has a first measured temperature and when the weld pool has a second measured temperature that is less than the first measured temperature, wherein the determined time interval represents the cooling rate of the weld.

The method may be conducted in situ. The time interval between when the weld pool has a first measured temperature and when the weld pool has a second measured temperature that is less than the first measured temperature may be determined when the travel speed of the welding device is 0 inches per second. The method may further comprise measuring a first location of the welding device when the first measured temperature is determined, measuring a second location of the welding device when the second measured temperature is determined, determining the physical distance between the first location and the second location, and dividing the physical distance by the travel speed of the welding device to determine the cooling rate. The at least one non-consumable thermal sensor may be capable of detecting temperatures in the range of 900° C. to 400° C. The welding device may be a welding torch. The method may further comprise determining the weld cooling rate continuously throughout the welding process and providing information regarding the weld cooling rate to a welding operator or to a mechanized welding controller.

Another implementation of the disclosed technology provides another method for determining the cooling rate of a weld, comprising locating at least one non-consumable thermal sensor at a predetermined location from a weld pool generated during an active welding process, wherein the thermal sensor is located within the same plane of travel as a welding device creating the weld pool; determining the travel speed of the welding device; using the at least one non-consumable thermal sensor to gather temperature data from the weld pool; and determining the time interval between when the weld pool has a temperature of 800° C. and when the weld pool has a temperature of 500° C., wherein the determined time interval represents the cooling rate of the weld.

The method may be conducted in situ. The time interval between when the weld pool has a temperature of 800° C. and when the weld pool has a temperature of 500° C. may be determined when the travel speed of the welding device is 0 inches per second. The method may further comprise measuring a first location of the welding device when a temperature of 800° C. is determined, measuring a second location of the welding device when a temperature of 500° C. is determined, determining the physical distance between the first location and the second location, and dividing the physical distance by the travel speed of the welding device to determine the cooling rate. The at least one non-consumable thermal sensor may be capable of detecting temperatures in the range of 900° C. to 400° C. The welding device may be a welding torch. The method may further comprise determining the weld cooling rate continuously throughout the welding process and providing information regarding the weld cooling rate to a welding operator or to a mechanized welding controller.

Still another implementation of the disclosed technology provides a method for determining the cooling rate of a weld in situ, comprising locating at least one infrared optical sensor at a predetermined location from a weld pool generated during an active welding process, wherein the infrared optical sensor is located within the same plane of travel as a welding torch creating the weld pool; determining the travel speed of the welding torch; using the at least one infrared optical sensor to gather temperature data from the weld pool; and determining the time interval between when the weld pool has a temperature of 800° C. and when the weld pool has a temperature of 500° C., wherein the determined time interval represents the cooling rate of the weld.

The time interval between when the weld pool has a temperature of 800° C. and when the weld pool has a temperature of 500° C. may be determined when the travel speed of the welding device is 0 inches per second. The method may further comprise measuring a first location of the welding device when a temperature of 800° C. is determined, measuring a second location of the welding device when a temperature of 500° C. is determined, determining the physical distance between the first location and the second location, and dividing the physical distance by the travel speed of the welding device to determine the cooling rate. The at least one infrared optical sensor may be capable of detecting temperatures in the range of 900° C. to 400° C. The at least one infrared optical sensor may be a camera. The method may further comprise determining the weld cooling rate continuously throughout the welding process and providing information regarding the weld cooling rate to a welding operator or to a mechanized welding controller.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1:
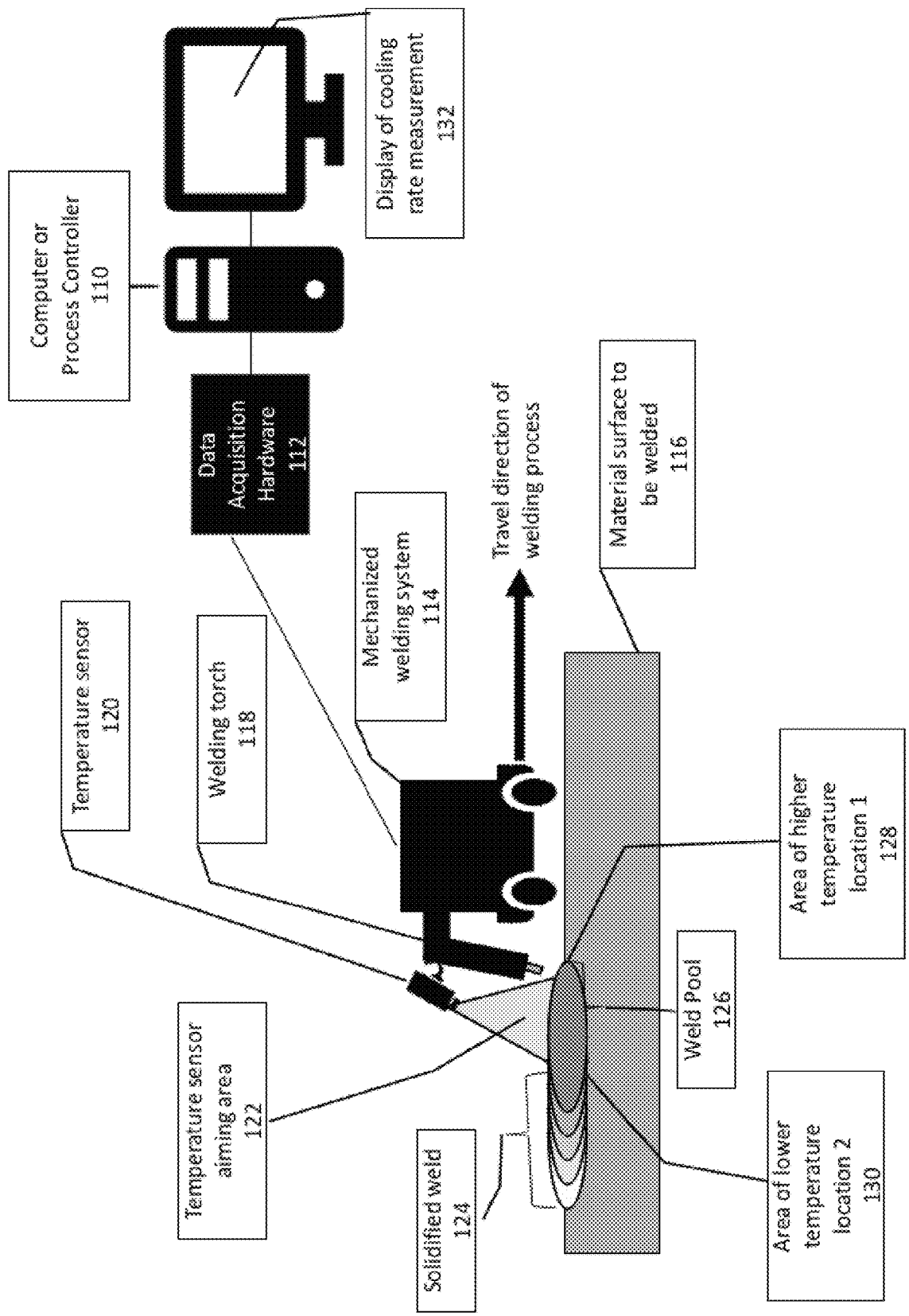
FIG. 1 is a block diagram of an example implementation of the disclosed system showing the basic components of the system.

Example implementations are described below. Although the following detailed description contains many specifics for the purposes of illustration, a person of ordinary skill in the art will appreciate that many variations and alterations to the following details are within the scope of the disclosed inventive subject matter. Accordingly, the following example implementations are set forth without any loss of generality to, and without imposing limitations upon, the claimed subject matter.

The disclosed technology provides a system and method for measuring the cooling rate of a weld that is in-process through the use of non-contact sensing of temperatures located at or near a molten weld pool. As previously discussed, weld cooling rates have a distinct effect on welds and the properties of the heat affected zones of those welds. Measuring the weld cooling rate permits welding process parameters to be more precisely controlled and facilitates the maintenance or enhancement of desired weld characteristics such as hardness and weld integrity.

Typically, measurement of weld cooling rates in metallic materials during fusion welding is accomplished by harpooning or manually plunging a thermocouple temperature sensor into the molten weld pool formed during the welding process. This method provides a one-time measurement of the cooling rate because the thermocouple is consumed during the measurement process. The disclosed technology differs from the thermocouple-based method by utilizing non-contact temperature sensors that measure a heated surface or molten weld pool continually, thereby permitting in-situ real-time temperature measurement in at least one location in the molten material or weld pool. The same temperature measuring apparatus can be used continuously throughout any fusion welding operation and may be reused in future welding operations.

Another known method for maintaining welding cooling rates utilizes mechanized welding procedures. While mechanized welding procedures are common, a welding operator must still ensure that appropriate weld parameters are used throughout a welding operation to produce desired weld properties. The disclosed technology differs from this method because it can be used to provide real-time temperature measurements that complete a feedback loop that automatically adjusts welding parameter settings to either eliminate operator involvement or supervision, or to provide the welding operator with additional input for maintaining desired welding parameters and controlling the cooling rate within a targeted range.

The disclosed system and method determines weld cooling rates through the use of one or more non-contact thermal sensors that measure surface temperature at a predetermined location and distance behind a weld pool as a weld process is occurring. The thermal sensors, which may be optical sensors such as infrared cameras (e.g., TIM640 thermal imaging video camera (Micro-Epsilon) or other types of thermal sensors (e.g., Keyence FT-H40K infrared spot temperature sensor (Radwell)) that are capable of detecting temperatures between 900° C. to 400° C., capture data that is used to determine a temperature immediately adjacent to a weld as the weld is being made. Temperature measurement data is collected in real-time using a data acquisition apparatus (e.g., National Instruments or LabJack data acquisition hardware) that is connected to and controlled by a data processor such as a computer or by other controller hardware. The computer or other controller includes data processing software (e.g., National Instruments LabVIEW) that uses the temperature data gathered from at least one location and the measured or known travel speed of the welding torch/process to calculate the cooling rate of the welded material.

FIG. 1 is a block diagram of an example implementation of the disclosed system showing the basic components of the system and an example welding environment in which the system operates, including: computer or process controller 110; data acquisition hardware 112; mechanized welding system 114, which travels in the direction indicated by the arrow in FIG. 1; material surface to be welded 116; welding torch 118; temperature sensor 120, which is mounted on or located in close proximity to welding torch 118; temperature sensor aiming area or region 122; solidified weld portion 124; liquefied weld pool 126; area of higher temperature 128; area of lower temperature 130; and display of the cooling rate measurement 132 on a computer monitor.

To determine a cooling rate, temperature data is gathered from at least one location at or near the weld pool in the same plane of travel as the weld. Because the travel speed of the welding torch across a weld surface (workpiece) is known, the rate of temperature change can be calculated by measuring the time required for the temperature of the molten material to decrease from 800° C. to 500° C., which is a known standard temperature interval for determining weld cooling rate. If the cooling rate for a single location is being determined, the time required for the change from 800° C. to 500° C. is measured when the welding torch stops and is at 0 inch/second. If the cooling rate for two or more locations is being determined, the physical distance between a point behind the welding arc when the temperature is 800° C. and a point behind the welding arc when the temperature is 500° C. is divided by the travel speed of the welding process to determine the cooling rate. A primary advantage of the disclosed system and method is that weld cooling rates can be continuously measured during the welding process with a non-contact, non-consumable sensor. Such real-time temperature measurement allow automation or improved welding operator awareness of welding parameter adjustments in-situ for maintaining a desired cooling rate and maintaining weld quality.

Figure 2:
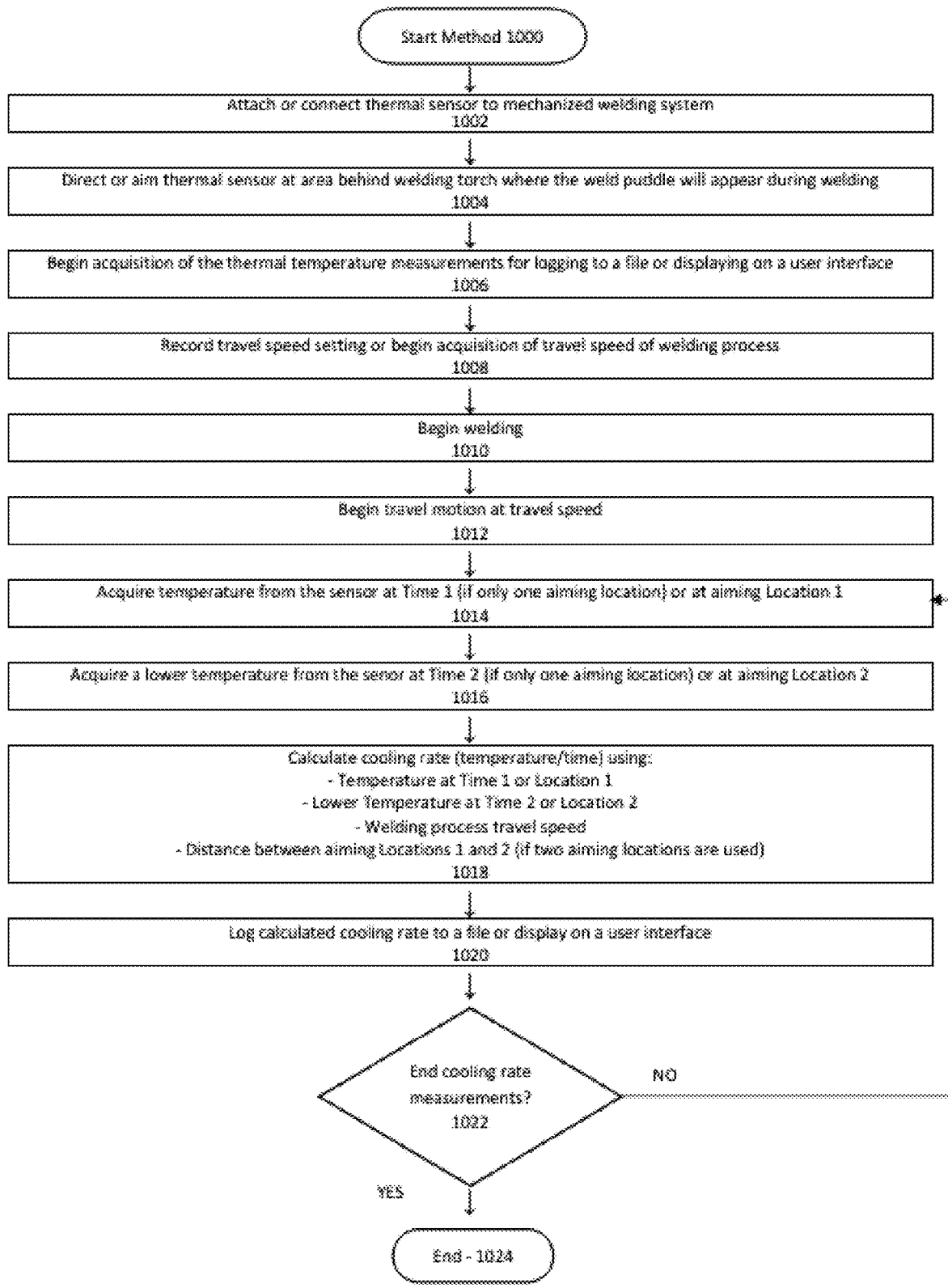
FIG. 2 is a flow chart of an example method for using the disclosed system and method.

FIG. 2 is a flow chart of an example method for using the disclosed system and method. In FIG. 2, the method starts at step 1000; a thermal sensor is attached or connected to a mechanized welding system at step 1002; the thermal sensor is directed or aimed the area behind the welding torch where the weld puddle will appear at step 1004; acquisition of the thermal temperature measurements for logging to a file or displaying on a user interface beings at step 1006; travel speed setting is recorded or the acquisition of travel speed of welding process begins at step 1008; welding begins at step 1010; travel motion at travel speed detection begins at step 1012; temperature from the sensor at Time 1 (if only one aiming location) or at aiming Location 1 is acquired at step 1014; a lower temperature from the senor at Time 2 (if only one aiming location) or at aiming Location 2 is acquired at step 1016; cooling rate (temperature/time) is calculated at step 1018 using Temperature at Time 1 or Location 1, Lower Temperature at Time 2 or Location 2, welding process travel speed, and distance between aiming Locations 1 and 2 (if two aiming locations are used); calculated cooling rate to a file or display on a user interface is logged at step 1020; and the system determines whether or not to end cooling rate measurements at step 1022 and either ends the process at step 1024 or continues the process from step 1014.

Either of two methods may be used for calculating the weld cooling rate depending on whether one or two measurement points are used. These methods apply to all non-contact thermal measurement instruments such as single point or areal field infrared cameras and involve the use of one or more thermal measurement devices. Thermal measurements can be made at any distance from the welding torch but are made on a plane that is in-line with the direction of welding or movement of the welding torch.

The "single point measurement method" involves the use of one temperature measurement point and includes: (i) monitoring the temperature at the chosen measurement point as a function of time (further including reading surface temperatures extending beyond the range of 800° C. to 500° C.); and (ii) tracking the time required for the temperature at that point to cool from 800° C. to 500° C. and dividing the temperature difference (800° C.-500° C.) by the time in seconds to reach 500° C. Therefore, the Cooling Rate=(800° C.-500° C.)/t, wherein t=time for temperature to decrease from 800° C. to 500° C. in seconds.

The "two point measurement method" involves the use of two distinct temperature measurement locations and includes: (i) monitoring the temperature at the two target locations, wherein the distance between the measurement points is known and held constant, and wherein the measurement points are in-line with the direction of welding; (ii) recording the distance between the two measurement points; (iii) recording temperature at each point as a function of time; (iv) recording the welding travel speed; and (v) at any time during welding, determining the cooling rate according to the following formula, which appears below as Equation (1):

$$\text{Cooling Rate} = (T1 - T2)/D1 * TS \quad (1)$$

wherein:
- T1 is the temperature at the point closer to the weld torch in degrees C.
- T2 is the temperature furthest away from the torch in degrees C.
- D1 is the distance between the two measurement points in inches or millimeters
- TS is the welding torch travel speed in inches per second or millimeters per second All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the present invention and simplifying the description, rather than indicating or implying that the referred devices or elements must be in a particular orientation or constructed or operated in the particular orientation, and therefore they should not be construed as limiting the present invention. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the present invention may be understood according to specific circumstances.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. A method for determining weld cooling in real time, comprising:
   (a) locating at least one non-consumable thermal sensor at a predetermined location from a weld pool generated during an active welding process, wherein the thermal sensor is located within a same plane of travel as a welding device creating the weld pool;
   (b) determining a travel speed of the welding device;
   (c) using the at least one non-consumable thermal sensor to gather temperature data from the weld pool;
   (d) determining a time interval between when the weld pool has a first measured temperature and when the weld pool has a second measured temperature that is less than the first measured temperature; and
   (e) measuring a first location of the welding device when a first measured temperature is determined, measuring a second location of the welding device when a second measured temperature is determined, determining a physical distance between the first location and the second location, and dividing the physical distance by the travel speed of the welding device to determine weld cooling in real time.

2. The method of claim 1, wherein the method is conducted in situ.

3. The method of claim 1, wherein the time interval between when the weld pool has a first measured temperature and when the weld pool has a second measured temperature that is less than the first measured temperature is determined when the travel speed of the welding device is 0 inches per second.

4. The method of claim 1, wherein the at least one non-consumable thermal sensor is capable of detecting temperatures in the range of 900° C. to 400° C.

5. The method of claim 1, wherein the welding device is a welding torch.

6. The method of claim 1, further comprising determining weld cooling in real time continuously throughout the welding process and providing information regarding weld cooling to a welding operator or to a mechanized welding controller.

7. A method for determining weld cooling in real time, comprising:
   (a) locating at least one non-consumable thermal sensor at a predetermined location from a weld pool generated during an active welding process, wherein the thermal sensor is located within a same plane of travel as a welding device creating the weld pool;
   (b) determining a travel speed of the welding device;
   (c) using the at least one non-consumable thermal sensor to gather temperature data from the weld pool;
   (d) determining a time interval between when the weld pool has a temperature of 800° C. and when the weld pool has a temperature of 500° C.; and (e) measuring a first location of the welding device when a temperature of 800° C. is determined, measuring a second location of the welding device when a temperature of 500° C. is determined, determining a physical distance between the first location and the second location, and dividing the physical distance by the travel speed of the welding device to determine weld cooling in real time.

8. The method of claim 7, wherein the method is conducted in situ.

9. The method of claim 7, wherein the time interval between when the weld pool has a temperature of 800° C. and when the weld pool has a temperature of 500° C. is determined when the travel speed of the welding device is 0 inches per second.

10. The method of claim 7, wherein the at least one non-consumable thermal sensor is capable of detecting temperatures in the range of 900° C. to 400° C.

11. The method of claim 7, wherein the welding device is a welding torch.

12. The method of claim 7, further comprising determining weld cooling in real time continuously throughout a welding process and providing information regarding weld cooling to a welding operator or to a mechanized welding controller.

13. A method for determining real time cooling of a weld in situ, comprising:
(a) locating at least one infrared optical sensor at a predetermined location from a weld pool generated during an active welding process, wherein the infrared optical sensor is located within a same plane of travel as a welding torch creating the weld pool;
(b) determining a travel speed of the welding torch;
(c) using the at least one infrared optical sensor to gather temperature data from the weld pool;
(d) determining a time interval between when the weld pool has a temperature of 800° C. and when the weld pool has a temperature of 500° C.; and
(e) measuring a first location of the welding device when a temperature of 800° C. is determined, measuring a second location of the welding device when a temperature of 500° C. is determined, determining a physical distance between the first location and the second location, and dividing the physical distance by the travel speed of the welding device to determine the weld cooling in real time.

14. The method of claim 13, wherein the time interval between when the weld pool has a temperature of 800° C. and when the weld pool has a temperature of 500° C. is determined when the travel speed of the welding device is 0 inches per second.

15. The method of claim 13, wherein the at least one infrared optical sensor is capable of detecting temperatures in the range of 900° C. to 400° C.

16. The method of claim 13, wherein the at least one infrared optical sensor is a camera.

17. The method of claim 13, further comprising determining weld cooling in real time continuously throughout the welding process and providing information regarding weld cooling to a welding operator or to a mechanized welding controller.

* * * * *